Patented Sept. 12, 1944

2,357,811

UNITED STATES PATENT OFFICE 2,357,811

CHEWING GUM BASE

Frank W. Corkery, Crafton, and Samuel G. Burroughs, Pittsburgh, Pa., assignors to Pennsylvania Industrial Chemical Corporation, a corporation of Pennsylvania No Drawing. Application April 13, 1940, Serial No. 329,577

8 Claims. (Cl. 99—135)

This invention relates to chewing gum bases containing synthetic resin.

It is the primary object of my invention to provide a chewing gum base of improved properties, and one which may be made by facilitated procedure, by virtue of the inclusion in the chewing gum base of a novel ingredient which we have discovered to possess unexpectedly advantageous adaptability for and in that association.

Heretofore coumarone-indene resin, which has its initial derivation in the by-product coking of coal, has been largely used in chewing gum bases. That resin, as normally produced, has inherently associated with it the distinctive odor of coal-derived aromatics. Whereas its constituent, indene, is a true hydrocarbon, its constituent, coumarone, is an oxygen-containing aromatic susceptible in its polymeric as well as in its monomeric form to aldehyde formation. The dimers of coumarone and indene in which the higher polymers of those substances are soluble possess in high order the characteristic odor and taste of coal-tar aromatics.

It is requisite, therefore, that coumarone-indene resin be given at least one specialized treatment preparatory to its inclusion in chewing gum bases, to eliminate substances of particularly disagreeable odor and taste, such as preformed aldehydes, and that it be pretreated to avoid, or to decrease the effect of aldehyde formation in the resin. The limited solubility of high melting couramone-indene resin, and the strongly unpleasant odor of its dimers, detracts from the desirability of coumarone-indene resin as an ingredient of chewing gum bases.

We have discovered, and upon such discovery our invention rests, that terpene resins may with peculiar advantage be included as an ingredient of chewing gum gases; both to replace coumarone-indene resin in known formulae typically including coumarone-indene resin; and in formulae containing ingredients with which coumarone-indene resin may not be included.

Terpene resins are made by the polymerization of certain terpene monomers present in the terpene material known as "gum spirits" of turpentine, and in the terpene material known as "wood turpentine." By polymerization of those monomers, polymeric terpene substances are produced which vary widely in melting point in accordance with the order of polymerization proportionally effected in their constitution, and in accordance with the proportional retention of terpene dimers, and terpenes of molecular weight lower than that of the dimers.

All of the terpenes are cyclic hydrocarbons responding to the general formula $C_{10}H_{16}$. They are not susceptible to the formation of aldehydes, which causes the progressive darkening, or "yellowing," to which coumarone-indene resin is particularly subject, and which also in large measure contributes to the disagreeable odor of that resin. Terpene resins produced by catalytic polymerization in terpene substances, such as gum spirits and wood turpentine have however been so difficult of production in their higher polymeric forms that there has not until recently been commercially available a terpene resin of even moderately high melting point which has possessed properties rendering its general use advantageous. There is available as a new material of commerce a terpene resin which, as produced in accordance with the method disclosed and claimed by Samuel G. Burroughs, in application Serial No. 288,390, filed August 4, 1939, is composed essentially, or at least preponderantly, of the polymers of beta-pinene. Whether or no such resin contains polymers of the other polymerizable terpenes, such as alpha-pinene and terpinolene, its melting point and its properties are so dependent upon its preponderant formation of beta-pinene polymers that we may justifiably term it beta-pinene resin. Currently this "beta-pinene" resin may be considered commercially to be high-melting terpene resin. In accordance with the extent to which it consists of beta-pinene polymers, and in accordance with the procedure employed in recovering the polymers, the beta-pinene resin may have a melting point of from about 80° C. to 150° C. (ball and ring) and higher.

This polymerization product, irrespective of its melting point, or average molecular weight, has a color intensity lower than a No. 1 color on the paracoumarone resin color scale. Its acid number and saponification number is approximately zero. It has a comparatively low iodine value, varying inversely with the melting point of the resin.

In its more modern formulation, chewing gum typically consists of rubber, or a rubber-like substance, to give strength and cohesion to the base; resin to modify the resilience inherent in the rubber in the base; and plasticizer to soften the mixture of rubber and resin. In the complete chewing gum, other ingredients, such as flavoring oils, sugar, and sometimes medicaments are included. Considering merely the chewing gum base, the rubber provides an extremely high molecular-weight and elastic content which cannot, by mere addition of a plasticizer, be brought to the condition of a solid coupling moderate deformability with moderate elasticity. The resin is a moderate molecular-weight inelastic and friable content, which cannot by mere addition of plasticizer be rendered elastic. The rubber and the resin best modify each other to give a chewing gum base having the most desirable conjunction of properties attributable to the rubber and to the resin, if the resin is of high melting point, and if the plasticizer be relied upon to soften both the rubber and the resin of the composition.

We have discovered that even the highest melting point terpene resin is wholly compatible with rubber to give a homogeneous mixture for plasticizing. It is also soluble in a white mineral oil of aliphatic constitution, even at relatively low temperatures, and is likewise soluble in the various vegetable oils, including edible oils, such as olive oil, cottonseed oil, hydrogenated oils and fats, and like oily substances conventionally used in chewing gum bases. It is compatible with solid aliphatics such as paraffin wax, and the other petroleum waxes. This compatibility and solubility it possesses without any specialized pre-treatment, such as hydrogenation.

While without specialized pre-treatment, the terpene resin even in its lower melting examples containing a substantial content of terpene dimers, possesses no unpleasant taste or odor, there is advantage derivable from using a high melting resin compatible with the rubber and plasticizer of the chewing gum base. The high melting resin tends to give a consistency of the most desirable sort, and lessens the tendency for the chewing gum to become soft and tacky when it has been for some time masticated. We have found that we may use terpene resin containing high polymers and from which dimers have wholly been removed, such for example as beta-pinene resin melting well above 100° C. with rubber of the sort conventional in the manufacture of chewing gum bases and with a plasticizer of conventional sort, to produce a permanently plastic chewing gum. That is, the chewing gum does not show any tendency to become "cheesy" by separation of the resin and rubber upon aging. The absence of "cheesiness," which is caused by a separation usually spoken of as "graining out" of the higher polymers of the resin, is attributable to a mutual solubility, or compatibility, of unusually high order.

It may here be explained that the phenomenon of cheesiness, above referred to, results in the well-known tendency of chewing gum to become brittle upon aging as its content of resin such as coumarone-indene resin, and its content of rubber, tend gradually to separate. Coumarone-indene resin, not having high solubility in aliphatics, may be considered to be substantially insoluble in white mineral oil. At a temperature of 50° C., even the fifth and sixth stage (i. e. 5 and 6 unit) polymers of coumarone and indene cloud out of white mineral oil. It is therefore impossible with coumarone-indene resin to use a high polymer resin plasticized with a relatively great quantity of white mineral oil. It would, therefore, be necessary to use a soft, odorous, coumarone-indene resin with white mineral oil, unless the nature of the coumarone-indene resin is altered, as by the relatively expensive expedient of hydrogenation. It may be noted that white mineral oil, being a tasteless and odorless plasticizer, would very desirably be included in chewing gum bases. Also, although the terpene dimers do not have an unpleasant taste and odor, it is desirable to use a high melting terpene resin which is devoid of taste and odor, in order that the chewing gum of which the base is used may have the full typical flavor of the conventional flavoring ingredients which are added to the base in making up the chewing gum for the market.

For these several reasons we prefer to use a terpene resin which does not have a large proportion of dimers, and which does contain a substantial proportion of relatively high polymers. While it cannot be established that there is any critical melting point at or above which the terpene resin becomes wholly desirable for our purpose, any terpene resin which melts from about 80° C. upward has a relatively low content of dimers and contains some polymers of desirably great molecular weight. As above indicated, high-melting terpene resin (terpene resin melting from 80° C.) is, as a material of commerce, currently represented by beta-pinene resin consisting essentially, or at least preponderantly, of beta-pinene polymers; although it is possible to make terpene resin which has such melting point, and which cannot be said to consist preponderantly of the polymers of beta-pinene.

Chewing gum bases in accordance with our invention may be made up in accordance with various formulae, and the following formulae are given merely as illustrative of bases including the terpene resin which also include in varying proportion the various conventional chewing gum base ingredients, such as the conventional gum grade rubber, rubber-like substances, waxes, balsams, oils, and the like. Illustrative formulae of this sort may be given as follows:

*Example 1*

| | Parts |
|---|---|
| Beta-pinene resin M. P. 135° C. (ball and ring) | 40 |
| White mineral oil | 25 |
| Gutta percha | 20 |
| Cottonseed oil | 10 |
| Paraffin wax | 5 |

*Example 2*

| | Parts |
|---|---|
| Beta-pinene resin M. P. 135° C. (ball and ring) | 50 |
| White mineral oil | 15 |
| Gutta percha | 20 |
| Olive oil | 10 |
| Candelilla wax | 5 |

These formulae give a chewing gum base which is adequately plastic and which remains plastic upon aging without the development of undesirable cheesiness and brittleness. When chewed, it is a firm plastic mass which does not develop undue softness or tackiness as mastication proceeds. It has no perceptible odor or flavor, and is therefore ideal for the addition of typical chewing gum flavors.

The relatively permanent plasticity of chewing gum bases illustrated by these formulae is attributable to the high solubility of the terpene resin in the conventionally included vegetable oils, and in the white mineral oil. The latter is a desirable ingredient which has been used in chewing gum bases, when the solubility of the included resin has permitted but cannot be considered to be a conventional ingredient of chewing gum bases because of the lack of commercially available, and otherwise satisfactory resins which are soluble in it. The chewing gum bases which include terpene resin do not have any lack of resistance to oral acids and alkalis attributable to the presence of the resin.

In compounding the chewing gum base, the plasticizers, or plasticizer, may be blended with the resin, and the blend when milled with the rubber; or, if the apparatus used be suitable, the resin and the rubber may simultaneously be mixed with each other and with the plasticizer, or plasticizers. It is to be understood that a terpene resin plasticized by its own dimer content to a melting point of about 50° C. to 70° C., may be used if the relatively pleasant terpene odor is not deemed objectionable, and if it is not deemed requisite that the chewing gum base have, by virtue of its resin content, the toughness attendant upon substantial inclusion of the higher terpene polymers.

It is to be emphasized that no specialized pre-treatment of the terpene resin is necessary, but that a well-purified terpene resin is in condition for use in chewing gum bases, without any treatment purposed to render it suitable for that use.

We claim as our invention:

1. A chewing gum base consisting essentially of conventional chewing gum base ingredients, white mineral oil, and high melting terpene resin unaltered by treatment.

2. A chewing gum base containing terpene resin unaltered by treatment, melting higher than 100° C., plasticized with white mineral oil.

3. A chewing gum base consisting essentially of conventional chewing gum base ingredients, white mineral oil, and terpene resin unaltered by treatment, melting within the approximate range of 80° C. to 150° C.

4. A chewing gum base consisting essentially of conventional chewing gum base ingredients, white mineral oil, and beta-pinene resin unaltered by treatment, melting within the approximate range of 80° C. to 150° C.

5. A chewing gum base containing beta-pinene resin unaltered by treatment, melting higher than 100° C., plasticized with white mineral oil.

6. A chewing gum base consisting essentially of conventional chewing gum base ingredients, white mineral oil, and high-melting beta-pinene resin unaltered by treatment.

7. A chewing gum base consisting essentially of high melting terpene resin unaltered by treatment and plasticized with white mineral oil to a melting point of about 50° C. to 70° C. for the blend, and conventional chewing gum base ingredients.

8. A chewing gum base consisting essentially of high melting beta-pinene resin unaltered by treatment and plasticized with white mineral oil to a melting point of about 50° C. to 70° C. for the blend, and conventional chewing gum base ingredients.

FRANK W. CORKERY.
SAMUEL G. BURROUGHS.